US011987762B2

(12) United States Patent
Gipson et al.

(10) Patent No.: US 11,987,762 B2
(45) Date of Patent: May 21, 2024

(54) FUEL TREATMENT DEVICE

(71) Applicant: Envirotron LLC, Weatherford, TX (US)

(72) Inventors: Carey Gipson, Weatherford, TX (US); Kenneth Thomas, Carrollton, TX (US)

(73) Assignee: ENVIROTRON LLC, Weatherford, TX (US)

( * ) Notice: Subject to any disclaimer, the term of this patent is extended or adjusted under 35 U.S.C. 154(b) by 65 days.

(21) Appl. No.: 17/765,318

(22) PCT Filed: Dec. 10, 2020

(86) PCT No.: PCT/MX2020/050056
§ 371 (c)(1),
(2) Date: Mar. 30, 2022

(87) PCT Pub. No.: WO2021/101364
PCT Pub. Date: May 27, 2021

(65) Prior Publication Data

US 2022/0340831 A1 Oct. 27, 2022

(30) Foreign Application Priority Data

Nov. 19, 2019 (MX) .................... MX/a/2019/013783

(51) Int. Cl.
*C10L 10/02* (2006.01)
*F02M 37/00* (2006.01)

(52) U.S. Cl.
CPC ......... *C10L 10/02* (2013.01); *F02M 37/0017* (2013.01); *C10L 2230/22* (2013.01)

(58) Field of Classification Search
CPC . C10L 10/02; C10L 2230/22; F02M 37/0017; F02M 27/02
USPC ............................................................ 44/639
See application file for complete search history.

(56) References Cited

U.S. PATENT DOCUMENTS 4,715,325 A * 12/1987 Walker .................. F02M 25/00 123/538
4,930,483 A * 6/1990 Jones .................... F02M 27/02 123/538
5,044,347 A * 9/1991 Ullrich .................. F02M 33/00 123/538
5,048,499 A * 9/1991 Daywalt ................ F02M 27/00 123/538
5,059,217 A * 10/1991 Arroyo ................ C10L 1/1208 123/538
5,069,190 A * 12/1991 Richards ............... F02M 27/02 123/538
5,393,413 A * 2/1995 Arand .................... C10G 35/04 208/138
5,695,531 A * 12/1997 Makino ................. F02M 27/02 137/274

(Continued)

*Primary Examiner* — Ellen M McAvoy
(74) *Attorney, Agent, or Firm* — Renner, Otto, Boisselle & Sklar, LLP

(57) ABSTRACT

The invention relates to a device for the fuel treatment such as petrol or diesel for internal combustion engines. The device has a housing provided with fuel supply lines at each of its opposite ends thereof. A central opening in the tubular housing that contains a metal bar that is formed of an alloy composition including copper, zinc, tin, manganese, aluminum, and iron. And the liquid fuel circulates through the fuel line in the housing where the metal center bar displaces to the second liquid fuel line.

6 Claims, 6 Drawing Sheets

(56) References Cited

U.S. PATENT DOCUMENTS

| | | | | |
|---|---|---|---|---|
| 5,814,227 | A | 9/1998 | Pavlis | |
| 5,816,226 | A * | 10/1998 | Jernigan | F02M 27/02 123/538 |
| 6,267,883 | B1 | 7/2001 | Weaver et al. | |
| 6,386,187 | B1 * | 5/2002 | Phykitt | F02M 27/02 123/538 |
| 6,989,095 | B2 | 1/2006 | Melton et al. | |

* cited by examiner

FIG. 4I
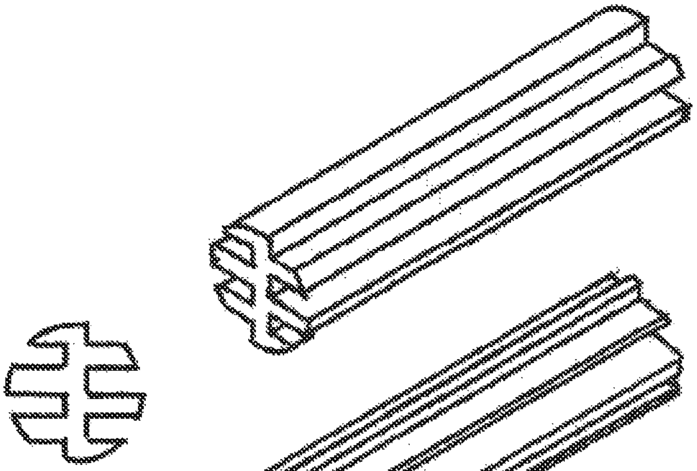
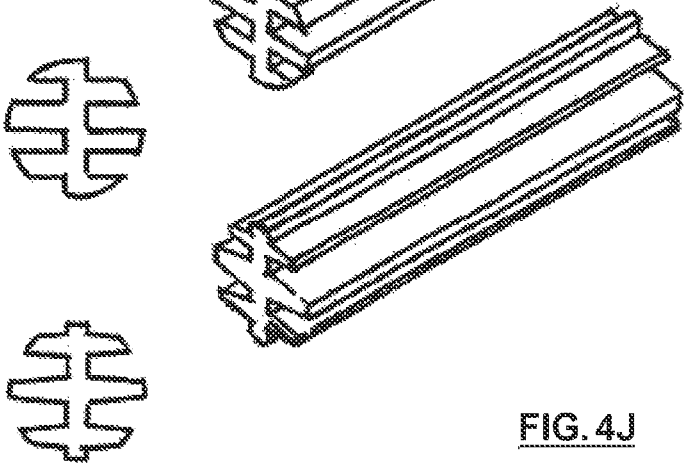
FIG. 4J

FUEL TREATMENT DEVICE

BACKGROUND

1. Field of the Invention

The present invention relates to a device for the treatment of hydrocarbon fuels used in internal combustion engines to improve combustion and reduce the emission of pollutants. More particularly, it relates to a treatment element of metal alloy fuel and a configuration of the element for use in the fuel flow path.

2. General Background of the Invention

It is a growing concern for the internal combustion engine manufacturing industry to improve its efficiency in order to use less petrol and diesel fuel while reducing harmful emissions into the atmosphere.

Some of the devices and methods used for such purposes include catalytic converters, as well as various chemicals being added to the fuel.

However, it remains a problem to make internal combustion engines work more efficiently, so that polluting emissions are lower. Below are described technologies used for the fuel treatment, which do not provide sufficient elements to overcome what is proposed by the present invention which is detailed below.

The U.S. Pat. No. 6,267,883 called water regulator to eliminate scale, is related to a device for regulating water and fuel, which has a core with a composition of 40-60% copper, 2-30% zinc, 10-25% nickel, 2-5% tin, the percentages are by weight and has traces of iron and lead. The core allows to decrease the amount of scale both in the water and in the fuel and increase the consistency in liquids. Examples are presented to improve the purity of the water and in the fuel there are low levels of hydrocarbons, of carbon monoxide, which are reduced during combustion. The combination of materials in the core, fail to create a fully efficient means for fuel reduction. However, the composition does not present the essential elements of the present invention.

U.S. Pat. No. 6,989,095 called method and apparatus for reducing scales, corrosion and paraffin accumulation in hydrocarbon pipes, wherein a fluid is forced to circulate by a filter in line with internal plates. This invention presents a modification of the electrostatic potential of the fluid when in contact with the plates. Modifying the potential allows for solid minerals and certain hydrocarbons to be better suspended in fluid. The suspension inhibits the formation of scale, paraffin, or corrosion in the pipes, wherein the plates have a composition of 40-66%, zinc of 2-28%, nickel of 5-25%, lead of 2-15%, tin of 1-5%, and traces of iron, antimony, sulfur, and manganese. This invention relates to the oil and gas industry, and processes thereof.

U.S. Pat. No. 5,814,227 referred to as a water treatment arrangement, describe a primary catalyst that to decrease the pH of the water to a value below 6.4. Palladium is suitable for the catalyst. The effect of reduced pH is to ensure that calcium carbonate does not precipitate. Soluble oxygen increases in water as it passes over said catalyst, resulting in the destruction of anaerobic bacteria. In addition, a second catalyst composed of an alloy of copper, tin, nickel and zinc on which water flows after leaving the primary catalyst, the secondary catalyst transforms water-reactive contaminants into stable ions and compounds that do not negatively affect the habitat of plants and animals. The water is inoculated with an effective treatment and has an improved value. The composition has the following percentages copper 37.070%, tin 14.140%, nickel 23.820%, zinc 24.920%, iron 0.010%, aluminum <0.010%, silicon 0.010%, manganese <0.010%, antimony 0.020%, sulfur <0.010% and phosphorus <0.010, it is to be observed that said improvement is focused on water treatment.

The present invention contemplates a less expensive and easier to manufacture device, which has better efficiency characteristics in the handling of the fuels of those currently known, referenced in the prior art in internal combustion engines that use petrol or diesel.

SUMMARY OF THE INVENTION

The present invention contemplates the drawbacks associated with the prior art and features an improved liquid fuel treatment device which is economical, easy to manufacture and provides optimal results in the treatment of the liquid fuel.

The device of the present invention comprises an elongated tubular housing having a central opening extending through it. A pair of liquid fuel supply lines extending outwardly at their opposite ends of the tubular housing, each liquid fuel line having an axial conduit that is in communication with the liquid fuel with the central opening of the tubular housing. There is a metal center bar comprising an alloy of copper, zinc, aluminum, tin, iron and manganese affecting the molecular structure of the liquid fuel that passes through the central opening of the tubular housing and, thus, the contaminants present in the liquid fuel are reduced.

To facilitate assembly of the liquid fuel treatment device, the tubular housing and at least one of the fuel supply lines form an integral unit. The liquid fuel supply line meets the opposite end of the tubular housing through a circumferential contour extending outwardly from a cylindrical element of the liquid fuel supply line, sizing and shaping the contour to be placed in an annular slot in the internal wall of the tubular housing adjacent the second end of the tubular housing. Increasing the diameter in the second liquid fuel supply line prevents further movement in the liquid fuel supply lines in the central opening at the second end of the tubular housing.

The metal bar has a cross-section and four narrow contours.

The fuel treatment device is adapted to the fluid stream entering the internal combustion chamber of a vehicle, without modifying the flow rate or velocity of the fluid, such that the recorded parameters relating to the fluid supplied to the internal combustion engine are not affected.

One of the main objectives of the present invention called fuel treatment device, is to reduce the fuel consumption by a central metal bar and elements that constitute it which reduce the size of the fuel particles, improving the combustion of the engine.

Another objective of the fuel treatment device is the reduction of pollutants that are emitted into the atmosphere, which is achieved by having a better combustion in the engine, allowing a large part of the fuel that enters the combustion chamber to be used in its entirety, and consequently the temperatures of the engine as well as the combustion chamber are the most optimal for the least formation of polluting particles.

Another objective of the fuel treatment device is the versatility for its installation in the various fuel media, without causing alterations to the fluid supply systems, mainly those media that supply liquid to the combustion chamber.

Another objective of the fuel treatment device allows conditioning the metal center bar according to the fuel demand required by the engine. The fuel treatment device has a diversity of dimensions and sizes according to the requirements of the fuel line towards the engine.

A further object of the present invention is to have a plurality of metal central bars with various contours, which are conditioned to the fuel flow line according to the fluid velocity levels that are required prior to entering the combustion chamber and thereby having the best metal central bar according to the requirements of the internal combustion engine to be used.

The fuel treatment device provides great advantages to the fuel efficiency of the internal combustion engine, as well as the reduction of combustion gases. The ratio of the composition in the metal center bar of the fuel treatment device is achieved under a selection coming from the combination of metals and the most optimal proportion.

The advantages of the fuel treatment device are as follows:

1. The results of an average test have shown a 10% decrease in fuel consumption, as well as a decrease in polluting agents.
2. Preventive and corrective maintenance of the device is minimal.
3. The device does not allow the incorporation of any substance into the fuel.
4. The device works in traditional combustion systems and in computer-controlled fuel systems.
5. The device is not subject to the efficiency and/or age of the internal combustion engine.
6. The device extends the useful life of the engine by eliminating and preventing carbon accumulation.
7. The device reduces carbon particles, hydrocarbons, carbon monoxides and nitrous oxides through conversion of the fuel before it enters the combustion chamber.
8. The device reduces the emission of gases into the atmosphere.
9. The device works effectively with diesel fuel #2 and low-sulfur diesel fuel.
10. The central metal bars of the device are installed in a body consisting of female type threads to a pin type connector at each of its ends, it has a versatility in the connection in small and large engines.
11. It works with both the hot and cold engine (as the fluid circulates).

The combination of the metals used allows the manufacture of other molds. The device forms a piece of the metal center bar that floats freely in a compound and a resin.

The internal element of the body is totally isolated from any metal contact, to obtain favorable results of the metal central bar, which causes less polluting emissions to the atmosphere, an increase in power and fuel efficiency is achieved, obtaining a more efficient combustion in the combustion chamber , also allows a higher peak energy, which leads to produce a wider torque in the crankshaft. A high torque performs more work with less fuel consumption and performance is improved by 10% on average.

When the fuel treatment device is placed in the fuel line before the combustion chamber, the fuel that is composed of large molecule chains is transformed into small molecule chains. Fuel composed of small molecule chains requires less oxygen for combustion, which translates into a more complete combustion and consequently less pollution and greater engine performance.

The fuel treatment device is isolated from any metal part and is located near the engine, this makes the amount of $CO_x$, $NO_x$ and $SO_x$ compounds that accompany other gases in the exhaust systems that are pollutants and harmful to the environment minimal.

BRIEF DESCRIPTION OF THE DRAWINGS

FIGS. 4A-4J shows a plurality of contours that the metal center bar of the fuel treatment device may have.

DETAILED DESCRIPTION OF THE INVENTION

A detailed description of the present invention is given below based on the Figs.

The present invention performs a load balance on the metals constituting the metal center bar of the device in order to create a +3 to +6 state that improves the ability to release more energy that is present in the fuels.

Transition metals form ions with different charges, regarding to other groups of atoms. The former is ionized in a reduced manner in the configuration of a noble gas such as $Sc_3$+ and $Ti_4$+. But Ti 2+ ions, and Ti 3+ ions are rarely observed . . . V forms oxocations. Manganese is more common in the +2 and +4, and +7 states in permanganate. Iron is commonly found at +2 or +3 and rarely +6. Cobalt, nickel, copper and zinc are ionized in +2. Copper also forms +1, sometimes cobalt and nickel can form +3.

Lanthanides form +3 ions, and Cerium can form a +4 ion. Actinides have multiple oxidation states. The thorium commonly forms +4 ions. The uranium forms +4 ions and is present in the +6 oxidation state in the uranyl ion ($UO_2$2+).

Transition metals are a group of elements with incomplete internal layers of electrons. They behave like metals that conduct heat, electricity, as well as ductile or stretchable and malleable. However, by behaving as metals they do not form salts when combined with non-metals, but rather tend to form complex ionic structures, transition metals form metal central bars and are capable of reacting under numerous oxidation states.

Figure 1:
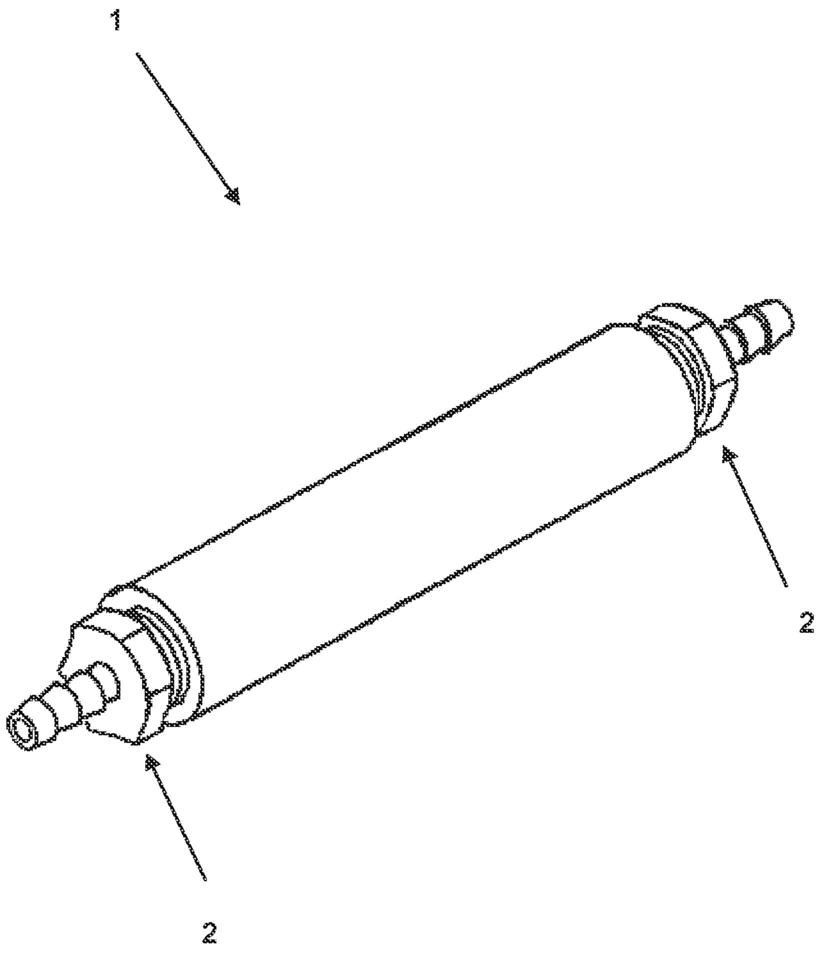
FIG. 1 is an isometric view of a fuel treatment device.
Figure 2:
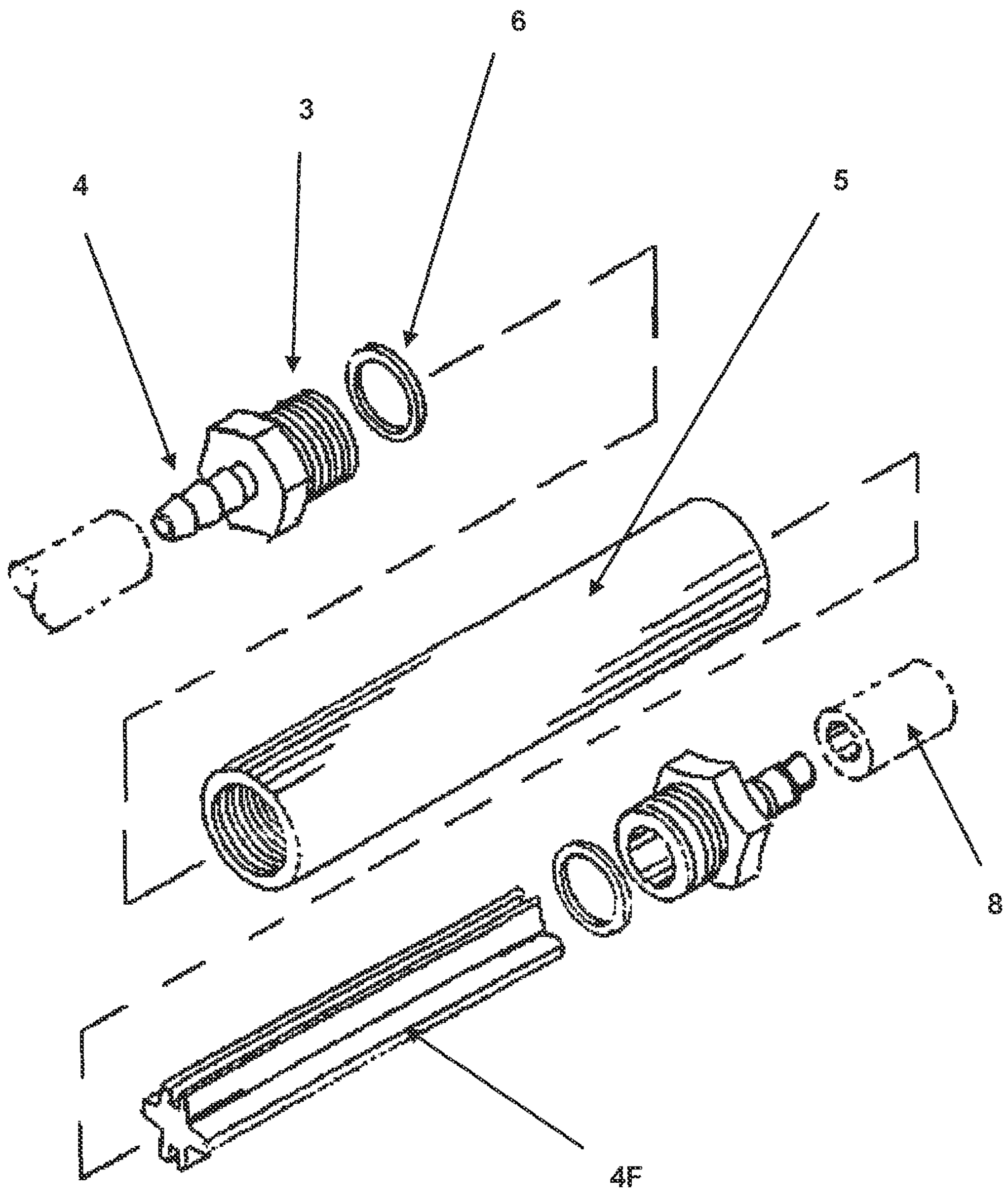
FIG. 2 is an isometric exploded view of FIG. 1 to show the internal and external elements.

The fuel treatment device shown in FIGS. 1 and 2 have two connection elements 2 arranged at both ends of the fuel treatment device 1, where the connection element is a nipple 2 that has a threaded end 3, which is inserted and screwed into the body 5 and at the end of the nipple 2 has a pin connector 4, at the other end of the body 5 the connections of a hose between the fuel source and the access of the fuel to the internal combustion engine are presented. There is an insulator 6 that prevents the metal center bar shown in FIGS. 4A-4J from touching the metal parts of the engine to which it is attached. The insulator 6 is disposed between the threaded internal face 3 and the core shown in FIGS. 4A-4J to allow adequate insulation. The body 5 is made of fiberglass (or any non-conductive plastic) that houses the metal center bar 4A-4J, the body is constituted by internal threads so that the components can slide inside the unit and prevent leakage.

Figure 3:
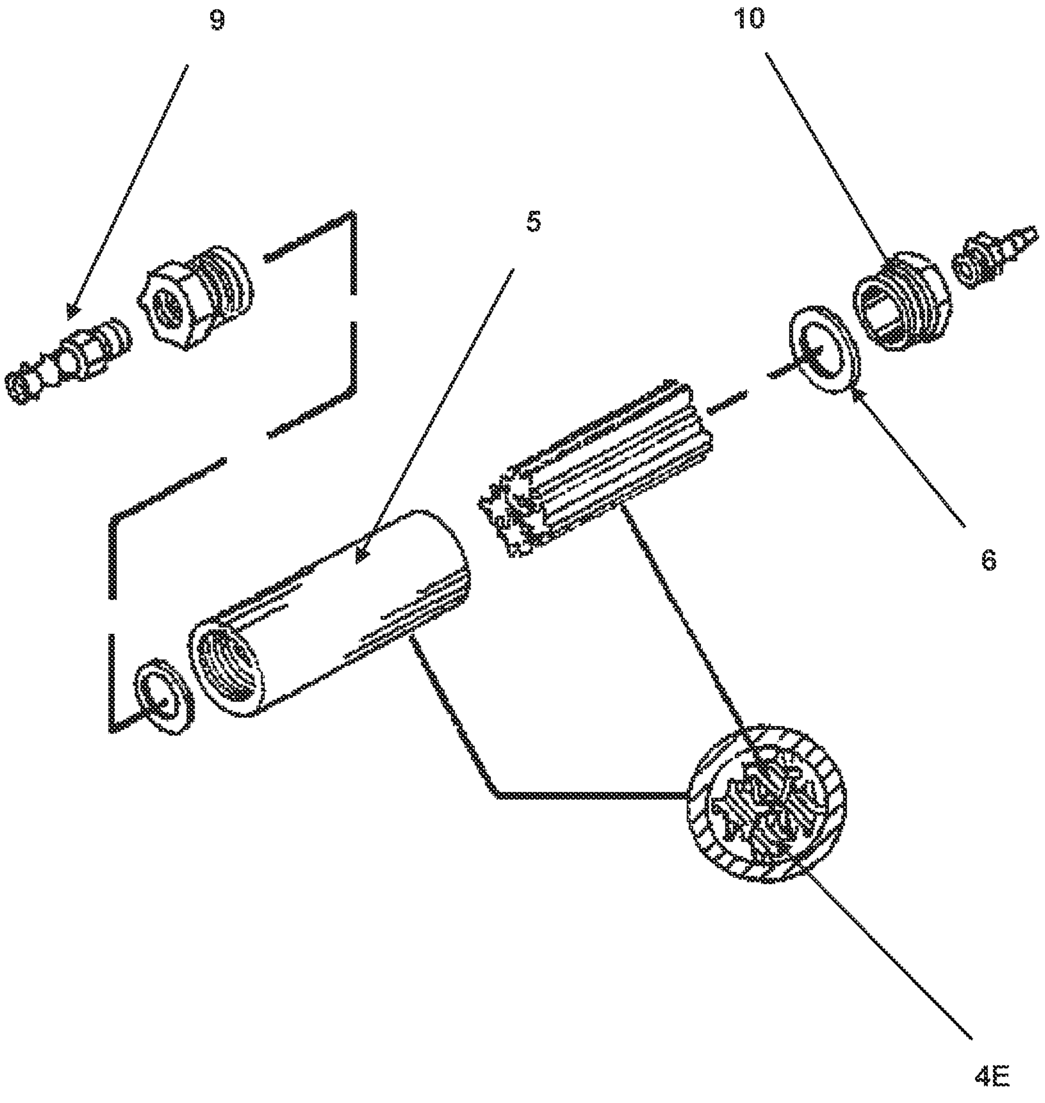
FIG. 3 is an isometric exploded view showing internal and external components with four of the metal center bar elements grouped for a larger engine.
Figures 4A, 4B, 4C, 4D:
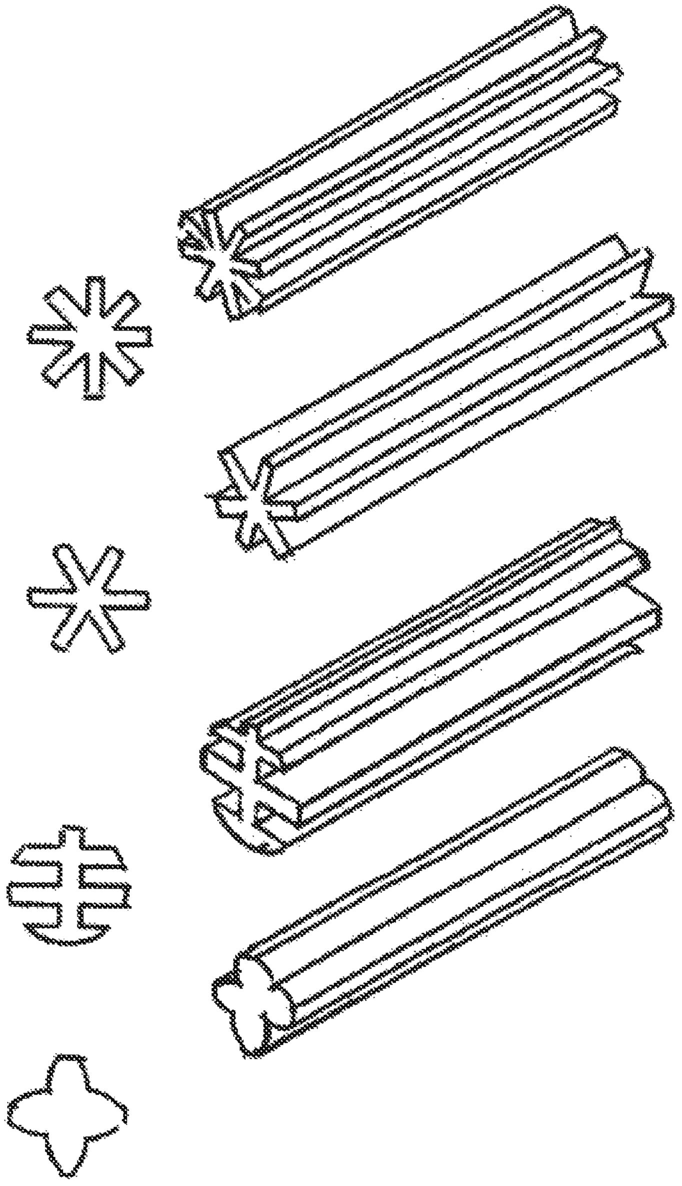
Figures 4E, 4F, 4G, 4H:
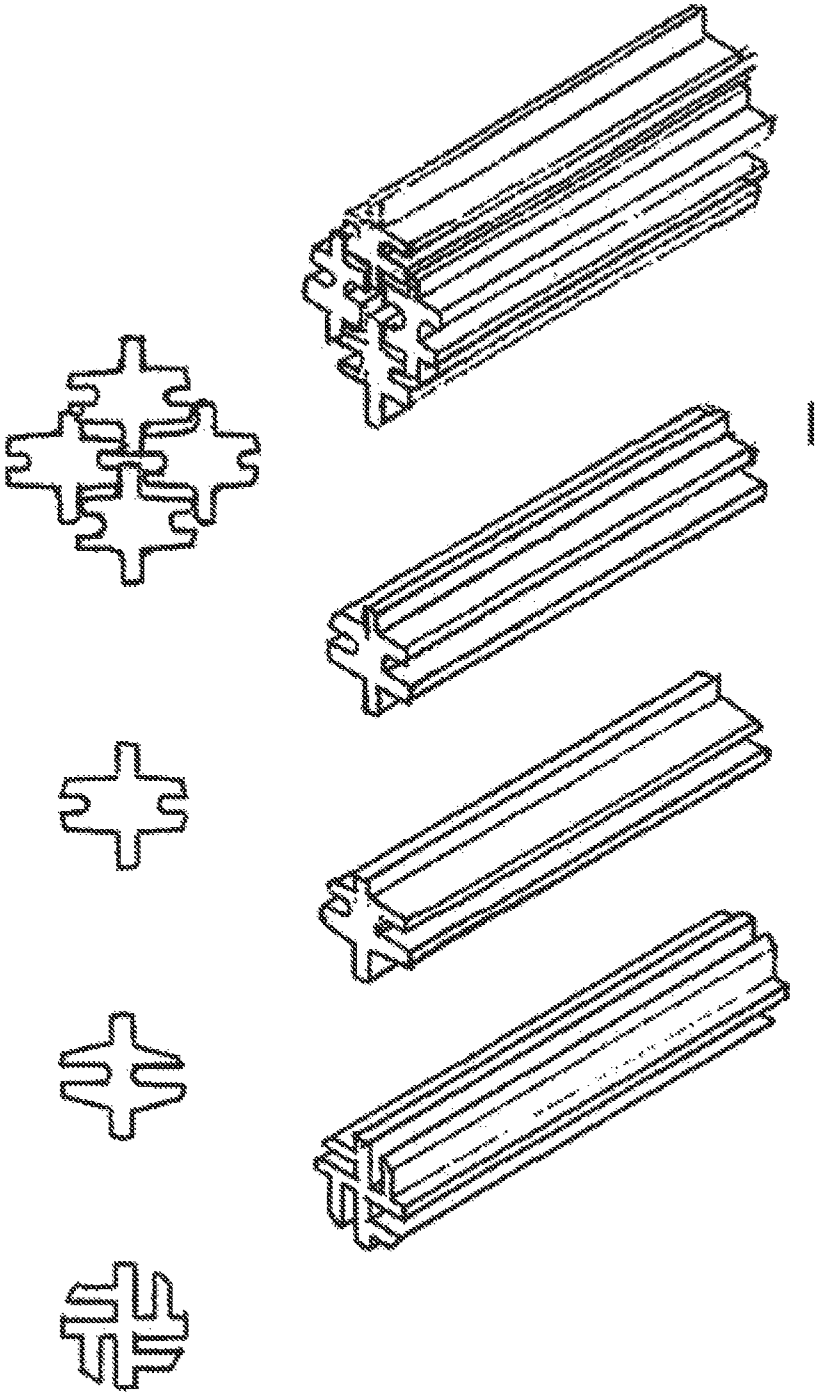

FIGS. 2 and 3 show the hoses 8 with dashed lines, which are made of rubber and which represent the connections of the fuel tank to the engine.

FIG. 3 has connection elements formed by the pin reducing parts 9, connection bushing and coupling that are reducing accessories that transition from a small inlet to a large one and vice versa from large to small, the body 5 of the device prevents the metal center bar from touching any metal part to which it is attached. The contours of the metal center bar may be a cartridge. The metal center bar has contours of 4, 8, 12 and 16 combinations, its use depends on the size of the engine as can be seen in FIGS. 4A-4J. In the body 5 that houses the metal center bar with internal threads so that all the components displace inside the device and prevent leakage. The metal center bars of FIGS. 4A-4J are of the same alloy, but differently, allowing them to be used as a single center bar or any combination.

Regarding the metal central bar of FIGS. 4A-4J, it has the following proportions: copper 60-66% by weight, zinc 22-30% by weight, aluminum 5-7.5% by weight, tin 2-5% by weight, iron 2-4% by weight and manganese 2.5-5% by weight, which allows the polluting emissions to the atmosphere with this balance to be minimal.

In FIGS. 4A-4J the contours of the center bars present a significant advantage to improve fuel saving and reduce the emission of polluting gases from the internal combustion engine.

According to the Technical Report project F. 61842.02.008 "VM Evaluation of catalytic converters OBD II, Additives for petrol and diesel", the evaluation of the Emission Reduction Device was carried out", pursuant to NMX-AA-151-SCFI-2013.

The evaluation consisted of evaluating the effect on regulated emissions with and without the emission reducing device in three test vehicles (VW Jetta 2009, Nissan Sentra 2017 and Nissan Versa 2018).

Electromechanical condition, exhaust and tire tests were performed on the test vehicles.

To the three test vehicles indicated in table 1, a review of the tuning was carried out, as indicated by the manufacturer (Clean air filters, lubricating oil status review, among other components), fluid levels were reviewed. Review of the tightness of the exhaust pipe, review of the conditions of the tires, electromechanical status and of the various sensors, with OBD LINK MX scanner (application for Mexico) for which the OBD-II system was verified, the conditions of the monitors according to the regulations, the existence of fault codes, existing codes and stored codes, as indicated below:

Verification of the Turning off of the MIL Light.

No Existence of existing Fault Codes.

No Existence of stored Fault Codes

No existence of standby Fault Codes

Activate the 5 monitors required pursuant to NOM 042 and NOM-151.

That the 5 monitors will be Completed

Once the inspection has been carried out, all three vehicles meet the minimum requirements to carry out the tests. Therefore, we proceeded to request the safekeeping of the three units from the Vehicle Emissions and Engine Test Laboratory, to carry out the emission determinations with the standardized driving cycle (FTP-7 5).

Description of the emission reducing technology.

The technology of the fuel treatment device for the reduction of pollutant emissions developed by the Co. Robótica y Automatización Industrial S.A. de C.V. (Raisa), this device consists of an external cylinder, resistant to heat and chemicals. Within it is constituted by a metal alloy bar of various transition metals (Copper (60-66%), Zinc (22-30%), Aluminum 5%-7.5%), Tin (2 to 5%), Iron (2-4%) and Manganese (2.5 to 5°/0).

The regulated emissions (CO, NMHC and NOX) and $CO_2$, of the three vehicles evaluated without and with the reducing device. Regarding to the vehicle Nissan, Versa 2018. A reduction in CO is observed of 22.3%, for NMHC it presents a reduction of 28.8%, 34.7% for NOX and without variation in the emission of $CO_2$. Regarding to the vehicle Nissan, Sentra 2017, when testing with the device and without, presents a 25.9% reduction in the emission of CO, for NMHC, a 8.8%, 8.0% reduction for NOx and without variation in the $CO_2$ emission. Finally, in the case of the vehicle VW Jetta, 2009, when making the determinations without and with the device, it presents a 36% CO reduction, for NMHC the reduction is about 30%, in NOx it is 22.0% and without variation in the $CO_2$ emission.

In Table 6, the emission results of the vehicles evaluated, it is to be noticed that this service was requested by the customer to know the comparative effect on regulated emissions and carbon dioxide without and with the emission reducing device Raisa.

TABLE 6

Results of regulated emissions and carbon dioxide of the three vehicles evaluated without and with the emission reducing device Raisa

| | Vehicle 2 (Nissan Versa 2018) License plates NDC-6354 (28,500 km) | | | | Vehicle 1 (Nissan Sentra 2017) License plates MYC-2334 (70,228 km) | | | | Vehicle 3 (Volkswagen Jetta 2009) License plates NGF-7309 (253,527 km) | | | |
|---|---|---|---|---|---|---|---|---|---|---|---|---|
| | CO g/Km | NMHC g/Km | NOx g/Km | CO2 g/Km | CO g/Km | NMHC g/Km | NOx g/Km | CO2 g/Km | CO g/Km | NMHC g/Km | NOx g/Km | CO2 g/Km |
| Baseline | 1.011 | 0.0351 | 0.049 | 205.02 | 1.899 | 0.0312 | 0.075 | 232.27 | 4.884 | 0.1502 | 0.684 | 276.28 |
| W/D (1) | 0.720 | 0.028 | 0.029 | 207.14 | 1.182 | 0.0267 | 0.070 | 235.81 | 3.177 | 0.1078 | 0.588 | 276.03 |
| W/D (2) | 0.862 | 0.022 | 0.034 | 205.80 | 1.631 | 0.0302 | 0.068 | 229.71 | 3.044 | 0.1026 | 0.497 | 276.59 |
| Average | 0.785 | 0.025 | 0.032 | 206.47 | 1.407 | 0.0286 | 0.069 | 232.76 | 3.11 | 0.1052 | 0.533 | 277.31 |
| % Variation | −22.26 | −28.77 | −34.69 | 0.71 | −25.91 | −8.81 | −8.00 | 0.21 | −36.32 | −29.95 | −22.08 | −0.35 |

Note:
W/D—With device
CO—Carbon monoxide
NMHC—Nonmethane hydrocarbons
NOx—Nitrogen Oxide
CO2—Carbon Dioxide Table 6 summarizes the emission results of the three vehicles evaluated, it should be noted that this service was requested by the customer to know the comparative effect on regulated emissions. References of applicable standards, regulations and standards.

1.—Standard NOM-042-SEMARNAT-2003.

2.—Standard NOM-167-SEMARNAT-2017.

3.—NMX-AA-151-SCFI-2013.

CONCLUSIONS

Regarding the exhaust emission evaluations with the FTP-75 driving cycle carried out on the vehicle, Nissan, Versa 2018 of 4 Cylinders and 1.8 liters, this presents reductions greater than 20% in the three regulated pollutants and without variation in the $CO_2$ emission.

Regarding the exhaust emission evaluations with the FTP-75 driving cycle carried out on the vehicle, Nissan, Sentra 2017 of 4 Cylinders and 1.6 liters, this presents reductions greater than 20% in the carbon monoxide emission, as regards the emission of NMHC and NOX, its reduction is less than 10% in both cases and without variation in the $CO_2$ emission.

Regarding the exhaust emission evaluations with the FTP-75 driving cycle carried out on the vehicle, VW, Jetta 2009 of 4 Cylinders and 2.0 liters, this presents reductions greater than 20% in the three regulated pollutants and without significant variation in the CO2 emission.

Although a preferred embodiment of the present invention has been described and exemplified, it should be emphasized that numerous modifications thereto are possible, such as the faster startup of the internal combustion engines, greater fuel savings, reduction of carbon accumulation in the engine parts, as well as the reduction of pollutants from the exhaust emissions. Therefore, the present invention should not be considered as restricted except as required by the prior art and by the scope of the appended claims.

The invention claimed is:

1. A fuel treatment device comprising:

an elongated tubular housing made of a material selected from fiberglass and non-conductive plastic;

a pair of fuel supply lines fixedly attached to the opposite ends of the tubular housing, each fuel supply line having an axial conduit in communication with the fuel;

a metal center bar positioned internally in the central opening of the tubular body, said metal center bar comprising an alloy of copper, zinc, aluminum, tin, iron and manganese;

an insulator that prevents the metal central bar from touching any metal parts of an engine to which the fuel treatment device is attached;

the metal center bar is in contact with the fuel circulating through the center opening; and wherein the metal center bar has contours that allow greater contact with the fuel circulating through the center opening.

2. The device according to claim 1, wherein the metal central bar is composed of a lead-free alloy that comprises copper 60-66% by weight, zinc 22-30% by weight, aluminum 5-7.5% by weight, tin 2-5% by weight, iron 2-4% by weight and manganese 2.5-5% by weight.

3. The device according to claim 1, wherein the fuel lines are coupled at the second end of the tubular housing.

4. The device according to claim 1, wherein the tubular housing has an internal wall provided with an annular slot adjacent to the second end of the tubular housing body.

5. The device according to claim 1, wherein the fuel supply line comprises a substantially cylindrical element having an outwardly extending circumferential contour.

6. The device according to claim 4, wherein the metal center bar comprises a central axis of cross-section and a plurality of contours, each of which extends outwardly through the total length of the metal center bar.

* * * * *